UNITED STATES PATENT OFFICE.

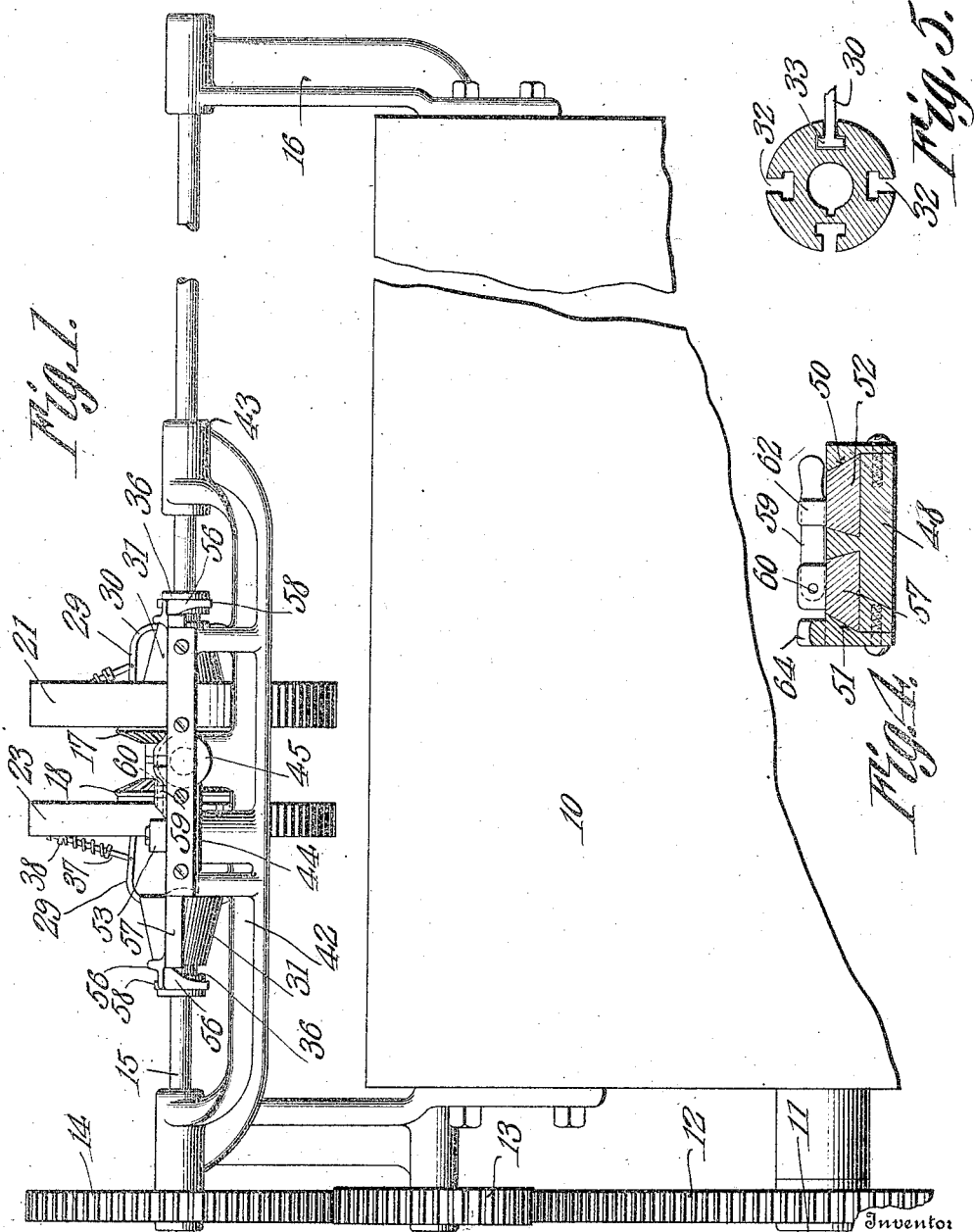

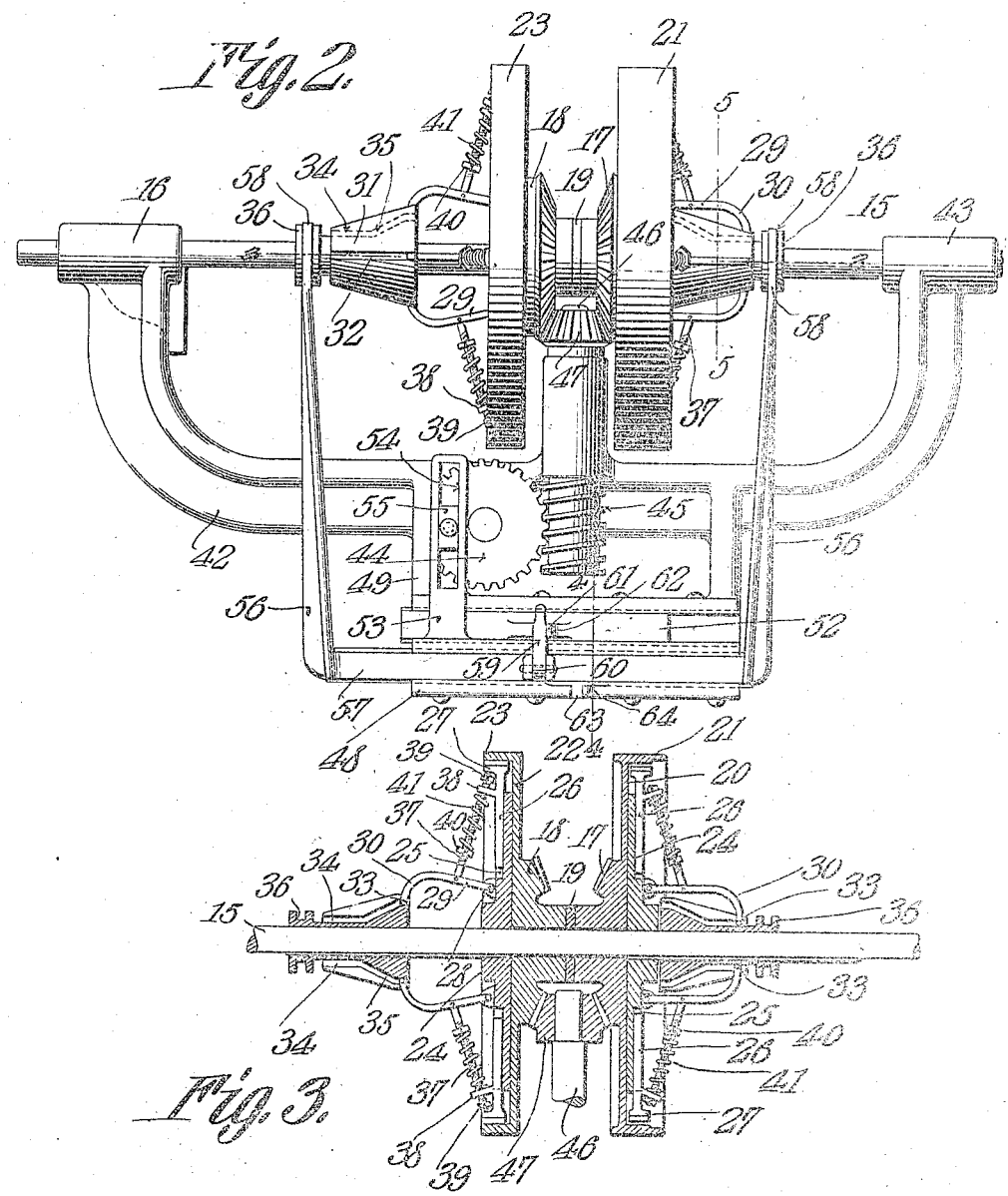

CHARLES KILROY, OF CEDAR RAPIDS, IOWA.

POWER-TRANSMISSION MECHANISM.

940,880.

Specification of Letters Patent.   Patented Nov. 23, 1909.

Application filed November 21, 1908.   Serial No. 463,845.

*To all whom it may concern:*

Be it known that I, CHARLES KILROY, a citizen of the United States, residing at Cedar Rapids, in the county of Linn and State of Iowa, have invented a new and useful Power-Transmission Mechanism, of which the following is a specification.

The present invention contemplates the provision of an improved mechanism for converting rotary movement, continuous in one direction, into rotary movement in which the direction of rotation is alternated and the mechanism is designed chiefly for use in driving rumbles, and particularly washing machine rumbles where it is designed to have the rumbles rotate a certain number of revolutions in one direction and then a corresponding number in an opposite direction and the primary object is to obviate the employment of two belts, such being the means commonly employed for securing this result in the class of machines mentioned. The mechanism is designed to be driven by a single power transmission device, either in the nature of a belt, worm gearing, or some other equivalent and suitable means. Furthermore, whereas, at the present time, it is customary, where two belts are employed for reversing the direction of rotation of the rumbles, to manually shift the belts, the mechanism of the present invention contemplates a continuously operating automatic reverse of the rumbles.

In the accompanying drawings, Figure 1 is a view in front elevation of a washing machine of the rumble type showing the application thereto of the drive mechanism embodying the present invention. Fig. 2 is a plan view in detail of the mechanism, Fig. 3 is a vertical longitudinal sectional view on the line 3—3 of Fig. 2. Fig. 4 is a vertical sectional view from front to rear on the line 4—4 of Fig. 2, and Fig. 5 is a view similar to Fig. 4 on the line 5—5 of Fig. 2.

In the drawings, the body of the washing machine is indicated by the numeral 10 it being understood that the body contains the usual rumble the shaft of which is indicated by the numeral 11, the rumble not being shown. This shaft 11 is driven, by means of a gear 12 thereon, and idler gear 13, and a gear 14, from a shaft 15 which is journaled in suitable bearings 16 preferably in a plane above the machine 10 although it will be understood that the shaft may be located to one side of the machine if found desirable or necessary. This shaft 15 is driven, in a manner which will be presently described, from a power shaft (not shown) and power is communicated therefrom to the rumble shaft 11 for the purpose of rotating the said rumble.

Loosely mounted upon the shaft 15 is a bevel gear 17 and a similar gear 18, the gears being arranged in opposition upon the shaft and having interposed between them a washer or other similar wear element 19. The gear 17 is formed upon a disk 20 which is provided with a peripheral flange 21 the outer surface of which flange being here shown as adapted to serve as a pulley for the connection of a drive belt (not shown) although it will be understood that the said surface of the flange may be of gear formation if found expedient. The gear 18 is formed upon a similar disk 22 and this disk is provided also with a peripheral flange indicated by the numeral 23.

Splined upon the shaft 15 to each side of each disk 20 and 22 is a disk 24 which lies within the circumference of the flange 21 or 23 of the respective disk 20 or 22 and each of these disks 24 is provided with a plurality of equi-distantly spaced radial grooves 25 in which are slidably mounted the stems 26 of friction clutch shoes 27 the friction surfaces of the shoes being designed to bear against the inner surfaces of the respective flange 21 or 23 when the stems are moved radially outwardly, the manner in which this movement of the stems is accomplished being hereinafter more fully described. Pivoted as at 28 to each of the disks 24 at points in the radial lines of extent of the grooves 25 in the said disks are arms 29 the outer ends of which arms are curved in the direction of the shaft 15 as indicated by the numeral 30. A frusto-conical head 31 is also splined upon the shaft 15 outwardly of each disk 24 and each of these heads is formed with grooves 32 equal in number to the number of arms 30, the grooves being substantially T-shaped as clearly shown in Fig. 5 of the drawings, and the arms being provided each at its outer extremity with a transverse pin 33 which works in the transverse portion of the respective groove, the said extremities of the arms working in the contracted portions of the grooves.

As clearly shown in Fig. 3 of the drawings, each groove is extended from the minor end of the head to a point substantially midway of the ends thereof in a line parallel with the shaft 15, as indicated by the numeral 34, and from this latter point to the major end of the head at an angle to the said shaft as indicated by the numeral 35 so that the grooves serve in effect as cams. Each of the heads 15 is formed beyond its minor end with a peripheral groove collar extension 36 designed for the engagement of an element which is operable to shift the head upon the shaft, and it will be understood that as the heads are shifted in a direction away from the respective disks 24, the transverse pins 33 of the arms 30 will ride up in the angularly extending portions 33 of the grooves in the head and will in this manner be moved in a direction radially away from the shaft 15. In order that this movement of the arms 30, which movement is upon their pivots 28, may act to force the friction shoes 27 radially and into frictional contact with the inner surfaces of the respective flanges 21 or 23, an arm 37 is pivoted to each of the arms 30 and is loosely engaged at its outer end through an ear 38 formed upon the corresponding stem 26 adjacent the outer end thereof, there being a nut 39 engaged upon the said outer end of each arm 37 so as to prevent its disengagement from the said ear 38.

Each of the arms 37 is provided adjacent its inner end with an adjustable nut 40 and engaged upon each arm and bearing at one end against this collar and at the other end against the ear 38 is a spring 41 which has a tendency to normally force the friction shoes 27 and their stems 26 outwardly radially from the shaft 15 and with the friction surfaces of the shoes contacting with the corresponding and heretofore mentioned surfaces of the corresponding flanges 21 or 23.

It will of course be understood that movement of the heads 31 in the direction of the disks 24 will result in the outer ends of the arms 30 moving radially inwardly toward the shaft 15 as a common center, and that this movement of the said arms will result in a pull being exerted upon the arms 37 to shift the friction shoe 37 in a corresponding direction and out of frictional contact with the friction surfaces of the corresponding flanges 21 or 23.

One of the bearings 16 is formed with an integral frame 42 which has at its end opposite the said bearing, a bearing 43 upon the shaft 15, the frame being however rigidly supported by the said bearing 16. Journaled for rotation upon this frame 42 at a point substantially midway of the ends thereof is a worm gear 44 and this gear meshes with the worm portion 45 of a shaft 46 which shaft carries at its inner end or in other words that end adjacent the shaft 15, a bevel pinion 47 which is at all times in mesh with both of the gears 17 and 18. The frame 42 is formed at its intermediate portion with an extension or auxiliary frame 48, the connecting portion of which frame is indicated by the numeral 49 and is formed with dovetailed grooves 50 and 51. A bar 52 dove-tailed in cross section is fitted for reciprocatory movement in the groove 50 in the connecting portion 49 of the auxiliary frame 48 and carried by this bar is an arm 53 provided with a slot 54. A block 55 swiveled upon the worm gear 44 works back and forth in the slot 54 as the worm wheel rotates and this movement of the block in the slot in the arm serves to impart to the bar 52 a reciprocatory movement as above stated.

A reciprocatory frame including side portions 56 and a connecting portion 57, which connecting portion is dove-tailed in cross section and is seated for sliding or reciprocatory movement in the groove 51 in the said connecting portion 49 of the auxiliary frame 48, has the ends of its side portions 56 of yoke formation as indicated by the numeral 58 and engaged in the groove 36 in the collar extensions of the heads 31, the heads being held in this manner in such relation one with respect to the other that when one head is moved so as to bring the respective frictional shoes 27 into frictional contact with the corresponding flange 21 or 23, the other head is out of position to accomplish such a result.

A latch 59 is pivoted as at 60 upon the connecting portion 57 of the frame last described and this latch is designed to be engaged normally in a notch or seat 61 formed in a boss 62 upon the upper face of the bar 52 so as to connect the reciprocatory frame last described with the said bar for movement in unison therewith it being understood that the heads 31 are in this manner shifted so as to alternately bring the corresponding set of friction shoes 27 into contact with the corresponding flanges 21 or 23. When it is desired to discontinue this operation of the mechanism, the latch 59 may be swung out of engagement with the notch 61 and may be dropped into engagement with a similar notch 63 formed in a boss 64 upon the upper face of the connecting portion 57 of the reciprocatory frame.

From the foregoing description of my invention, it will be understood that there is a continuous rotation of the disk 20 and its associated gear 17 and that this rotation of the gear will impart a continuous rotary movement in one direction to the bevel pinion 47 and its shaft 46 and that this rotation of the shaft will result in rotation of the worm gear 44 and reciprocation of the bar 52. As heretofore stated, reciprocation of this bar 52 imparts a corresponding movement to the reciprocatory frame of the mechanism and the heads 31 are shifted continuously from one extreme to the other so as to alternately shift the corresponding sets of friction shoes 27 into frictional engagement with the corresponding flange 21 or 23. It will be understood that when one set of shoes 27 is in engagement with the flange 21, the disk 20 will be clutched with the shaft 15 and the said shaft will be rotated in one direction thereby rotating the rumble in a like direction, and that when the other set of friction shoes 27 is in frictional engagement with the flange 23, the disk 22 and its associated bevel gear 18 will be clutched with the shaft 15, and the said shaft will be rotated in an opposite direction thereby reversing the direction of rotation of the rumble. It will further be understood, that inasmuch as the grooves 32 are, for one-half of their length, extended in a line parallel with the shaft 15, one gear 17 or 18 will be absolutely free for rotation independently of the shaft 15 while the shaft is being rotated by the other one of the two gears mentioned.

What is claimed is:—

1. In a mechanism of the class described, a shaft, clutch elements loosely mounted on the shaft, clutch elements mounted upon the shaft for rotation therewith and for coöperation with the first-mentioned elements, and means for alternately bringing the second-mentioned clutch elements into engagement with the corresponding first-mentioned elements, said means comprising a gear driven from one of the first-mentioned clutch elements, a sliding bar having a slotted extension, a pin upon the gear working in the slot in said extension, a reciprocatory frame having extensions operatively connected with second-mentioned clutch elements, and a pivoted latch carried by the frame and engageable with the bar whereby to connect the frame with the bar for reciprocation.

2. In mechanism of the class described, a shaft, clutch elements loosely mounted on the shaft, clutch elements mounted upon the shaft for rotation therewith, and for coöperation with the first-mentioned elements, and means for alternately bringing the second-mentioned clutch elements into engagement with the corresponding first-mentioned elements, said means comprising a sliding bar, gear connections between one of the first-mentioned clutch elements and the bar for reciprocating the bar, a reciprocatory frame having extensions operatively connected with the second-mentioned clutch elements, and a pivoted latch carried by the frame and engagable with the bar whereby to connect the frame with the bar for reciprocation.

3. In mechanism of the class described, a shaft, clutch elements loosely mounted upon the shaft, clutch elements mounted upon the shaft for rotation therewith and for coöperation with the first-mentioned elements, and means for alternately bringing the second-mentioned clutch elements into engagement with the corresponding first-mentioned elements, said means comprising a fixed support, a gear mounted to rotate upon the support, a sliding bar having an extension operatively connected with the gear, a reciprocatory frame mounted upon the support and having extensions operatively connected with the second-mentioned clutch elements, and a latch pivoted upon the reciprocatory frame and engageable with the bar whereby to connect the frame for reciprocation with the bar, said latch being engageable also with the support whereby to hold the frame against reciprocation.

4. In mechanism of the class described, a shaft, clutch elements loosely mounted on the shaft, clutch elements mounted upon the shaft for rotation therewith and for coöperation with the first-mentioned elements, and means for alternately bringing the second-mentioned clutch elements into engagement with the corresponding first-mentioned elements, said means comprising a fixed support, a gear mounted to rotate upon the support and driven from the first-mentioned clutch elements, a sliding bar having a slotted extension, a pin upon the gear working in the slot of said extension, spaced lugs upon the bar, a reciprocatory frame having extensions operatively connected with the second-mentioned clutch elements, spaced lugs upon the fixed support, and a latch pivoted upon the frame and engageable between the lugs upon the bar to connect the frame with the bar for reciprocation and engageable also between the lugs upon the support to hold the frame against reciprocation.

In testimony that I claim the foregoing as my own, I have hereto affixed my signature in the presence of two witnesses.

CHARLES KILROY.

Witnesses:
D. B. GETTY,
MAURICE FLANIGAN.